(12) United States Patent
Eifrig et al.

(10) Patent No.: US 7,840,119 B2
(45) Date of Patent: Nov. 23, 2010

(54) METHODS AND APPARATUS FOR PROCESSING PROGRESSIVE I-SLICE REFRESHED MPEG DATA STREAMS TO ENABLE TRICK PLAY MODE FEATURES ON A DISPLAY DEVICE

(75) Inventors: Robert O. Eifrig, San Diego, CA (US); Walter Anderes, San Diego, CA (US); Bridget Diane Kimball, Encinitas, CA (US); Paul Douglas Baker, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1736 days.

(21) Appl. No.: 10/256,044

(22) Filed: Sep. 25, 2002

(65) Prior Publication Data

US 2004/0056884 A1 Mar. 25, 2004

(51) Int. Cl.
*H04N 7/26* (2006.01)
*H04N 5/93* (2006.01)
*H04N 5/91* (2006.01)

(52) U.S. Cl. .................. 386/111; 386/112; 386/52; 386/68; 386/4; 386/5; 386/6; 386/7

(58) Field of Classification Search ......... 386/111–112, 386/52, 68, 4–7
See application file for complete search history.

(56) References Cited

U.S. PATENT DOCUMENTS

| 5,057,916 | A |  | 10/1991 | Krause et al. |
| 5,477,397 | A |  | 12/1995 | Naimpally et al. |
| 5,568,200 | A |  | 10/1996 | Pearlstein et al. |
| 5,579,183 | A | * | 11/1996 | Van Gestel et al. ............ 360/48 |
| 5,717,816 | A |  | 2/1998 | Boyce et al. |
| 5,778,143 | A |  | 7/1998 | Boyce |
| 6,137,834 | A | * | 10/2000 | Wine et al. ................... 375/240 |
| 6,373,905 | B1 | * | 4/2002 | Yasuda et al. ................ 375/340 |
| 6,380,991 | B1 | * | 4/2002 | Teichmer ................ 375/240.01 |
| 6,434,195 | B1 |  | 8/2002 | Luthra et al. |
| 6,920,178 | B1 | * | 7/2005 | Curet et al. ............. 375/240.14 |
| 7,177,522 | B2 | * | 2/2007 | MacInnis ...................... 386/68 |

(Continued)

FOREIGN PATENT DOCUMENTS

EP 0 485 798 5/1992

(Continued)

*Primary Examiner*—Thai Tran
*Assistant Examiner*—Helen Shibru
(74) *Attorney, Agent, or Firm*—Larry T. Cullen

(57) ABSTRACT

A display device with personal versatile recorder capabilities is provided which is capable of processing progressive I-slice refreshed MPEG data streams to enable trick play mode features. The display device comprises a receiver for receiving a progressive I-slice refreshed MPEG data stream having I-slices distributed over multiple P-frames. The display device further comprises a syntax parser for parsing the data stream to locate I-slices which make up an I-frame. A storage device is provided for storing the data stream. The display device also comprises an interface for receiving a command for a trick play mode feature. A processor associated with the syntax parser recovers the located I-slices from the storage device and assembles the recovered I-slices into one or more constructed I-frames. A decoder is provided for decoding the constructed I-frames to enable the trick play mode features.

37 Claims, 4 Drawing Sheets

U.S. PATENT DOCUMENTS

2001/0043792 A1   11/2001  Mishima et al.
2002/0061183 A1    5/2002  MacInnis
2003/0016939 A1*   1/2003  Yun ............................. 386/5
2008/0040740 A1*   2/2008  Plotnick et al. ............... 725/32

FOREIGN PATENT DOCUMENTS

EP           1 009 166        6/2000

* cited by examiner

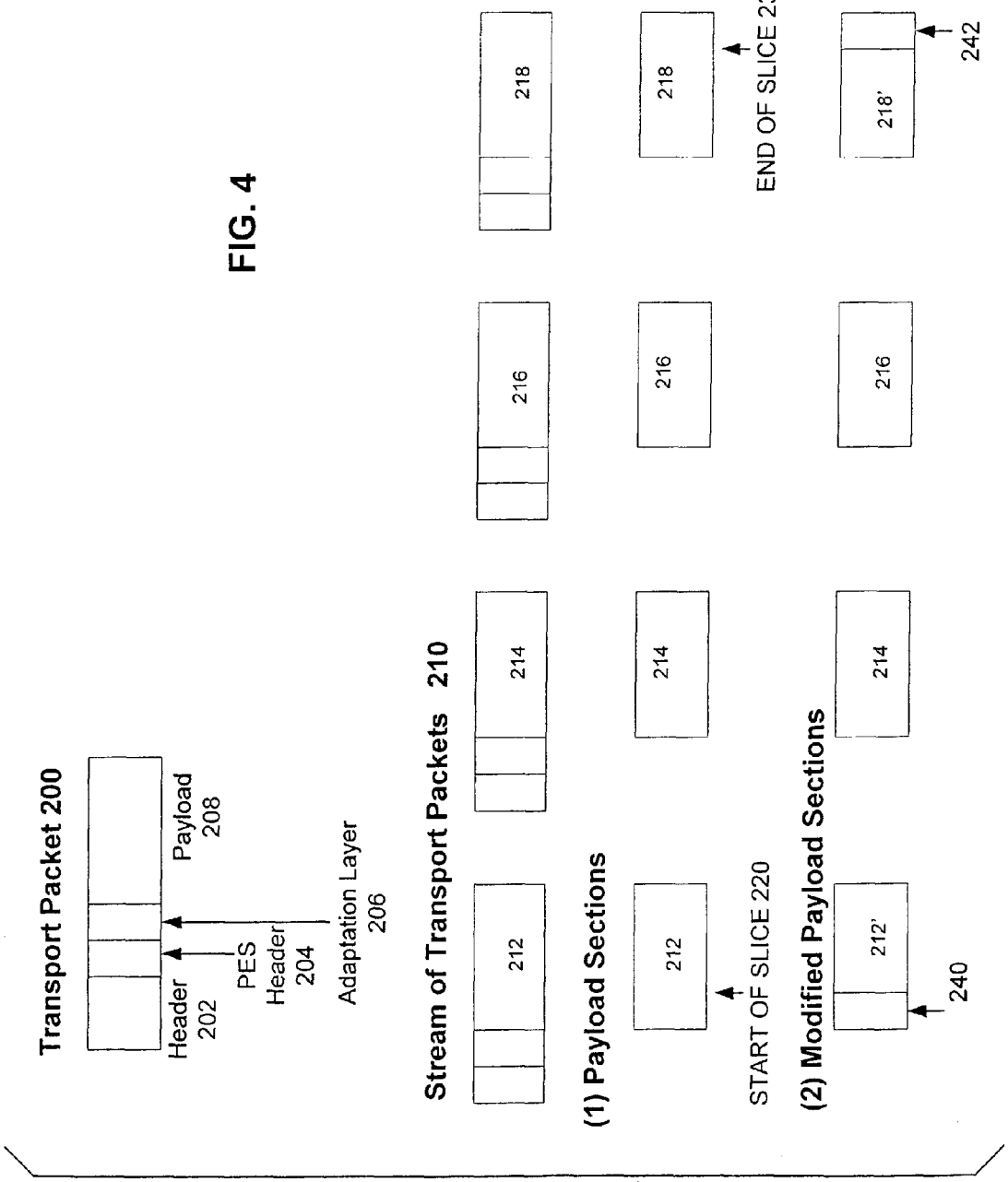

METHODS AND APPARATUS FOR PROCESSING PROGRESSIVE I-SLICE REFRESHED MPEG DATA STREAMS TO ENABLE TRICK PLAY MODE FEATURES ON A DISPLAY DEVICE

BACKGROUND OF THE INVENTION

The present invention relates to MPEG digital video encoding and decoding (e.g., for digital television). In particular, the present invention relates to methods and apparatus for processing progressive I-slice refreshed Moving Pictures Expert Group (MPEG) data streams to facilitate "trick play" modes on a display device. Trick play modes include pause, fast forward, rewind, jump, still frame display, and the like.

In order to understand the concept of progressive I-slice refreshed MPEG data streams, it is necessary to understand some basics about the typical I-frame based MPEG data stream. MPEG gets much of its compression capability by sending only the changes between different video frames. A first type of frame, known as a prediction or "P" frame, contains an abridged set of data used by the decoder to predict a full frame from a previous "P" frame or from a previous complete frame (an intra-coded "I" frame) in the video stream. The stream merely carries "fine tuning" information to correct errors from an approximate prediction. An I-frame is compressed without motion prediction. Thus, a full video frame can be reconstructed from an I-frame without reference to any other frame. In this manner, errors in the prior frame predictions will be eliminated once an I-frame arrives and is decoded. Bi-directional "B" frames are like P-frames, except that the prediction is made not only from the previous I-frame or P-frame, but also from the next one. MPEG data streams encoded in this manner are referred to herein as "I-frame based MPEG data streams." An I-frame based MPEG data stream may start with an optional Group-of-Pictures (GOP) header followed by an I-frame. The video frame can be reconstructed from the GOP without reference to other frame information.

In progressively refreshed streams, such as taught in commonly owned U.S. Pat. No. 5,057,916 to Krause et al. entitled "Method and Apparatus for Refreshing Motion Compensated Sequential Video Images," sequential video images are refreshed one region at a time. A different region in each of the plurality of video images is communicated without compression during a refresh cycle. In this manner, an image area defined by the region is progressively refreshed by the non-compressed regions during the refresh cycle. Compression of video images may be controlled to prevent data contained in regions not yet refreshed during a current refresh cycle from corrupting data contained in regions that have been refreshed during the current refresh cycle.

When an MPEG encoder is used in the progressive refresh mode, the I-frames are broken into slices and distributed across the transmitted P-frames as I-slices. MPEG data streams encoded in this manner are referred to herein as "progressive I-slice refreshed MPEG data streams." The spreading of I-slices over multiple P-frames equalizes the bit rate and does not present a problem when the stream is played back sequentially. However, when trying to implement trick play modes in a progressive I-slice refreshed MPEG data stream, the lack of I-frames requires either extremely large buffers for several pictures worth of data or the stream must be fully decoded and then re-encoded as an I-frame based stream resulting in a loss of quality. This additional decoding and re-encoding also requires extra hardware, thereby incurring extra cost in the display device (e.g., set-top terminal, digital video recorder, personal versatile recorder, and the like).

It would be advantageous to provide a method and apparatus for enabling trick play modes on progressive I-slice refreshed MPEG data streams and other types of progressively refreshed data streams. It would be further advantageous to provide such a scheme where the processing required for enabling trick play modes is minimized to allow for real time performance. It would be advantageous to provide for improved visual characteristics of video during trick play modes such as fast forward and rewind. It would be advantageous to provide such improvements regardless of whether the data stream is an I-frame based stream or a progressively I-sliced refreshed stream.

The methods and apparatus of the present invention provide the foregoing and other advantages.

SUMMARY OF THE INVENTION

The present invention provides methods and apparatus for processing progressive I-slice refreshed Moving Pictures Expert Group (MPEG) data streams to facilitate "trick play" modes on a display device. A display device with personal versatile recorder capabilities is provided which is enabled to process progressive I-slice refreshed MPEG data streams to enable trick play mode features. The display device comprises a receiver for receiving a progressive I-slice refreshed MPEG data stream having I-slices distributed over multiple P-frames. The display device further comprises a syntax parser for parsing the data stream to locate the I-slices which make up an I-frame. A storage device is provided for storing the data stream. The display device also comprises an interface for receiving a command for a trick play mode feature. A processor associated with the syntax parser is provided for recovering the located I-slices from the storage device and assembling the recovered I-slices into one or more constructed I-frames. A decoder is provided for decoding the constructed I-frames to enable the trick play mode features.

BRIEF DESCRIPTION OF THE DRAWINGS

The present invention will hereinafter be described in conjunction with the appended drawing figures, wherein like numerals denote like elements, and:

FIG. 4 shows an example stream of transport packets in accordance with the present invention.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

The present invention uniquely solves the problems of high-speed rewind and fast-forward trick play modes for a display device, such as a digital video recorder (DVR) or personal versatile recorder (PVR) application manipulating MPEG compressed video streams.

Two problems of high speed trick play modes are (1) the very fast decoder and transport data rates required (2) a "slide show" effect when the incoming video stream data rate exceeds the decoder's maximum input rate and pictures must be skipped (not decoded and thus not displayed).

The invention addresses two modes of MPEG compression, I-frame and progressive I-slice refreshed compression. Rather than skipping entire pictures, pieces of individual pictures (referred to herein as "slices"), are assembled to form pictures. The resulting visual effect provides more continuity of motion during a high-speed forward or rewind trick play modes.

For I-slice compression, the invention particularly reduces the amount of data that is needed from the hard disk drive during a mode of high-speed trick play (fast forward or rewind). This is because I-slice compression relies on several pictures to build the current picture to be displayed. The set of pictures required to build a complete picture is referred to as a refresh cycle. A complete set of pictures in a refresh cycle must be read from the storage media and decoded by the video decoder in order to display one picture. Fast rewind speed exceeds the video decoder data throughput, so the decoder cannot keep up to this data rate and display frames must be repeated while a new refresh cycle is decoded. To solve this problem, a constructed I-frame picture is built from an existing MPEG stream, by "cutting and pasting" of the intra-coded slices that are concatenated to form one full picture per refresh cycle. Only the constructed I-frame picture must be transported from the storage media to the video decoder. This greatly reduces the required bandwidth by the transport system and the video decoder.

Figure 1:
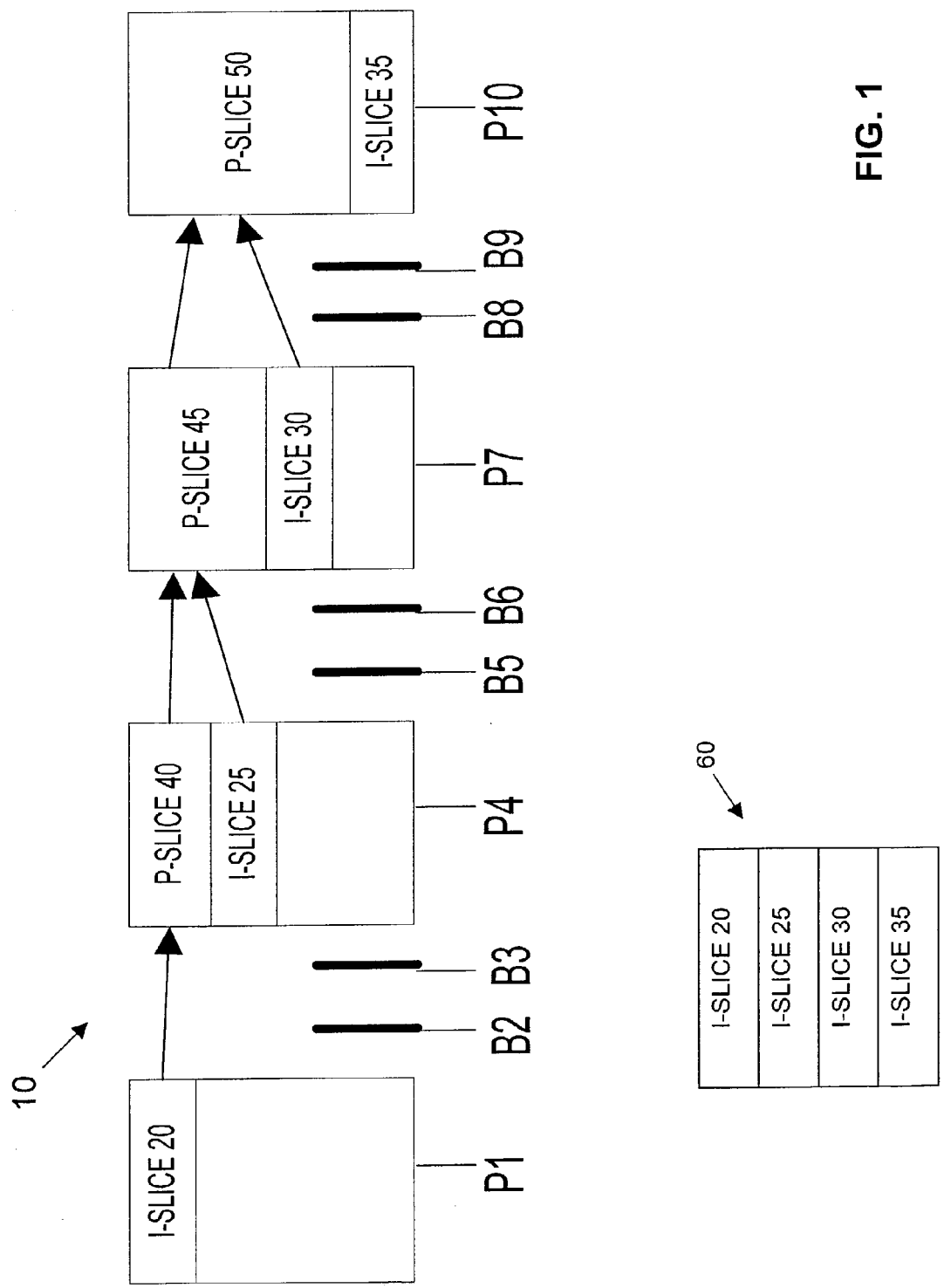
FIG. 1 shows an example of a progressive I-slice refreshed data stream.

The progressive I-slice based refresh mode does not have a GOP header, nor does it have any I-frames. The entire stream is built as a "PBBPBBPBBPBBP . . ." sequence where "P" represents P-frames and "B" represents B-frames. FIG. 1 shows an example of a progressive I-slice refreshed MPEG data stream. The I-frame is divided into slices and spread, as I-slices, uniformly over the P-frames. In the example shown in FIG. 1, an I-frame is divided into four I-slices 20, 25, 30, and 35. The four I-slices 20, 25, 30 and 35 are spread over four P-frames, P1, P4, P7 and P10. By spreading a single I-frame as multiple I-slices over multiple P-frames in this way, the burst data rate can be averaged from one I-frame over several P-frames. In other words, the instantaneous bit rate is equalized over each frame. B-frames are encoded the same way as in I-frame based refresh mode. The placement of the B-frames are indicated in FIG. 1 as B2, B3, B5, B6, B8, and B9.

Of the four P-frames, each one has slices that are intra coded, while the rest of the P-frame has motion estimation based on the previous picture, so that reconstructing a P-frame requires the previous frame. With a progressive I-slice refreshed approach, no prediction can be made as to how many frames are required to build a picture. However, the 'refresh rate' parameter can be set from, e.g., two to thirty-two frames in the encoder. The refresh rate is number of total frames in a refresh cycle. This means that, on average, the 'refresh rate' number of frames are required to collect a complete set of I-slices and build a complete video picture. It should be appreciated, however, that this refresh rate parameter can vary in other encoder designs.

In the example shown in FIG. 1, a refresh rate of 10 is indicated, as the P-frames P1, P4, P7, and P10 and interspersed among six B-frames (B2, B3, B5, B6, B8, and B9) so that 10 total frames are required before a picture is completely refreshed using all four I-slices 20, 25, 30 and 35. I-slice 20 contained in P-frame P1 provides reference macroblocks used to create motion vectors that predict the contents of P-slice 40 in P-frame P4. In the same way, I-slice 25 and P-slice 40 contained in P-frame P4 provide reference macroblocks that can be used to predict the contents of P-slice 45 contained in P-frame P7. Similarly, I-slice 30 and P-slice 45 contained in P-frame P7 provide reference macroblocks that can be used to predict the contents of P-slice 50 contained in P-frame P10. I-slice 35 and P-slice 50 contained in P-frame P10 provide the next P-frame (not shown) with reference macroblocks for the predicted part of the picture.

The general concept of the present invention is to build a constructed I-frame 60 from just the intra-coded slices (20, 25, 30, and 35) from each of the P-frames in a refresh cycle. The constructed I-frame algorithm relies on the fact that concatenating the intra-coded slices of the P-frames in a refresh cycle builds a complete picture without gaps between slices. In other words, each P-frame each holds a piece of the puzzle (an I-slice) that forms the constructed I-frame 60.

A consequence of a constructed I-frame 60 built from several different pictures on slice boundaries is that motion between slices in a single constructed I-frame may not be contiguous. This is because there is motion between the several P-pictures within a refresh cycle. During a high-speed trick mode such as rewind or fast forward, this artifact of seams at the slice points is a small distraction compared to the improved visual effect of the overall motion in the scene.

Figure 2:
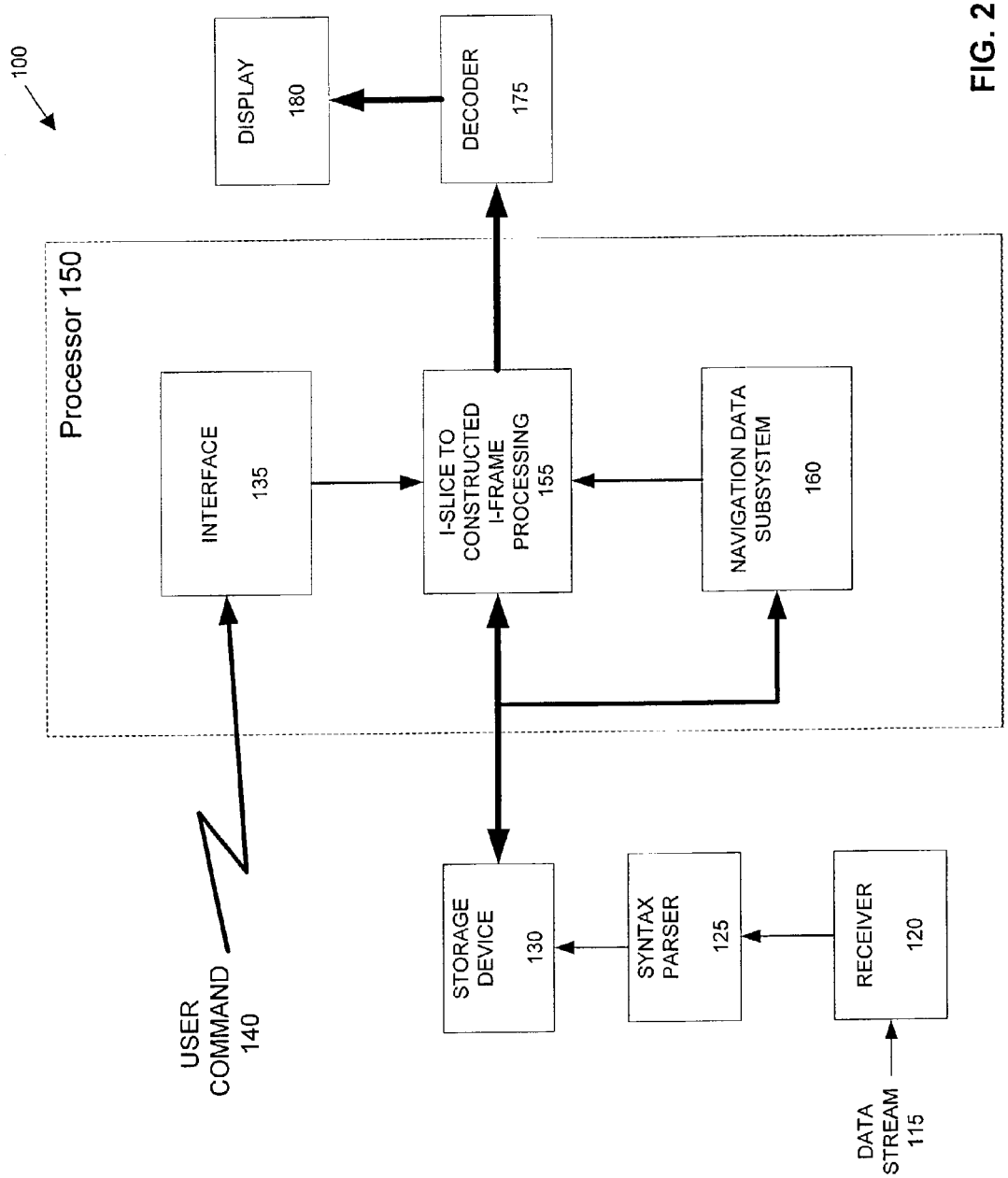
FIG. 2 shows a block diagram of an example implementation in accordance with the present invention.

In an example embodiment of the invention as shown in FIG. 2, a display device 100 with personal versatile recorder capabilities is provided which is enabled to process progressive I-slice refreshed MPEG data streams to enable trick play mode features. The display device comprises a receiver 120 for receiving a progressive I-slice refreshed MPEG data stream 115 having I-slices distributed over multiple P-frames (e.g., as shown in FIG. 1). The display device 100 further comprises a syntax parser 125 for parsing the data stream to locate the I-slices which make up an I-frame. A storage device 130 is provided for storing the data stream. The display device 100 also comprises an interface 135 for receiving a command 140 for a trick play mode feature (e.g., via a remote control). A processor 150 associated with the syntax parser 125 is provided for recovering the located I-slices from the storage device 130 and assembling the recovered I-slices into one or more constructed IGIC-frames (as shown at Box 155). A decoder 175 is provided for decoding the constructed I-frames to enable the trick play mode features. The trick play mode features may comprise at least one of rewind and fast forward.

The constructed I-frame of the present invention reduces the complexity of trick play modes. In a preferred exemplary embodiment, the decoder 175 may only decode constructed I-frames for use during the trick play mode features. Each macroblock which forms the constructed I-frame is an intra-coded macroblock. Therefore, the constructed I-frames are easily decoded by the decoder 175, since there is no motion compensation for these frames. As the inventive algorithm is symmetrical, forward and rewind trick play modes work in essentially the same way.

The display device 100 may comprise one of a personal versatile recorder (PVR), a digital video recorder, a set-top terminal, a digital television, a cellular telephone, a personal digital assistant, a personal computer, or the like.

The I-slices which make up the constructed I-frame may be distributed over N P-frames. The N P-frames may be provided in the data stream each refresh cycle.

In a further example embodiment, the syntax parser 125 may provide indexing data comprising a location of each I-slice within the data stream. The indexing data 125 may be stored on the storage device 130 and accessed by the processor 150 (e.g., navigation data subsystem 160 of processor 150) to locate and recover the I-slices. The indexing data may further comprise a location of each I-slice positioned at a top portion of a P-frame. I-slice 20 of FIG. 1 is an example of an I-slice positioned at a top portion of a P-frame (P1).

The processor 150 may be adapted to access the indexing data independently from accessing of the data stream. The processor 150 may also be adapted to accesses the indexing data either sequentially or at random temporal locations.

The command 140 may comprise a fast forward command establishing a fast forward interval. In such an example embodiment, the indexing data may be used to locate a nearest I-slice positioned at the top portion of a P-frame in the data stream. The nearest I-slice and I-slices subsequent in time thereto are recovered and assembled to form a constructed I-frame. For the duration of the fast forward interval, the indexing data is used to locate subsequent additional I-slices positioned at the top portions of P-frames in the data stream. Each subsequent additional I-slice and I-slices subsequent in time thereto are recovered and assembled to provide additional constructed I-frames. The result is a video sequence composed of constructed I-frames, which can be passed directly to the decoder 175 for decoding prior to display on display 180.

The nearest I-slice may comprise one of an I-slice located forward of a current data stream position or prior to a current data stream position. This can be accomplished since the indexing data can be efficiently traversed either forward or backward in the order it was recorded.

The command 140 may comprise a rewind command establishing a rewind interval. For implementing a rewind mode, the indexing data is used to locate a nearest I-slice positioned at the top portion of a P-frame in the data stream. The nearest I-slice and I-slices subsequent in time thereto are recovered and assembled to form a constructed I-frame. For the duration of the rewind interval, the indexing data is used to locate previous additional I-slices positioned at the top portions of P-frames in the data stream. Each previous additional I-slice and I-slices subsequent in time thereto are recovered and assembled to provide additional constructed I-frames.

As can be seen from the forgoing description, the algorithm employed for a rewind command is slightly modified from the algorithm used for a fast forward command. For rewind, successive I-slices positioned at the top portion of the P-frames are located in reverse order, but the constructed I-frame is assembled by obtaining the I-slices reading forward from each top of frame I-slice Oust as when implementing the fast forward mode).

Those skilled in the art will appreciate that the construction of the I-frame for the first I-frame to be displayed in response to a trick play mode command 140 need not begin at the top portion of a P-frame. For example, the assembly of the first constructed I-frame may begin with a first located I-slice, regardless of its position within the P-frame. In an example embodiment, the fist located I-slice may be positioned below a top portion of a P-frame. In such an embodiment, the constructed I-frame may contain a blank portion above the position of the first located I-slice. Subsequent constructed I-frames will be complete I-frames without a blank portion.

I-slice 20 of FIG. 1 is an example of an I-slice positioned below a top portion of a P-frame (P4) The command 140 may establish a trick play mode speed. The trick play mode speed may correspond to a refresh rate of the MPEG data stream 115. For example, consider a transport stream with a refresh rate of 30 frames per second. The corresponding display will always display 30 frames per second. A constructed I-frame is assembled using all the P-frames in the transport stream refresh rate (i.e. one second of the transport stream at normal play rate). Therefore, 30 seconds worth of transport stream will produce 30 unique constructed I-frames for display during fast forward or rewind modes, for a fast forward or rewind display rate equal to the refresh rate (e.g., 30 times that of the normal play rate).

Alternatively, the trick play mode speed may correspond to a multiple of a refresh rate of the MPEG data stream 115. To achieve such an effect, constructed I-frames must be skipped over during fast forward and rewind modes which require speeds faster than the refresh rate. For example, if the refresh rate is 30 frames per second and 60 seconds worth of transport stream were used, 60 constructed I-frames would be produced. However, as only 30 of the constructed I-frames could be presented in one second, the decoder may drop every other constructed I-frame, thereby providing a fast forward or rewind display rate of 60 times the normal play rate.

Similarly, a fast forward or rewind rate less than the refresh rate may be provided, by using each constructed I-frame more than once during the trick play mode display. For example, a fast forward or rewind rate which is half that of the refresh rate can be provided by using 15 seconds of the transport stream. In such an instance, 15 constructed I-frames will be assembled, and each one must be displayed twice to accommodate the 30 frames per second display rate, thereby providing a fast forward or rewind rate of 15 times the normal play rate. Those skilled in the art will appreciate that the rewind or fast forward rate may be any multiple of the refresh rate. However, when providing a fast forward or rewind rate less than the refresh rate, it is preferable to maintain an even repeat rate of each constructed I-frame. Therefore, the refresh rate should be evenly divisible by the number of seconds of transport stream used.

The constructed I-frame algorithm may also be modified to work with an I-frame based data stream. The resulting picture is similar to I-slice compression in that the picture displayed in trick play mode is built from several pictures. With an I-frame based data stream, complete I-frames are already present in the data stream. These complete I-frames do not rely on other frames to be decoded as they contain all intra-coded macroblocks. To produce a high speed forward or rewind without the 'slide show' effect which would occur if only the complete I-frames were decoded for display during these trick play modes, pieces (i.e. slices) of several complete I-frames may be concatenated to form a constructed I-frame. For example, the receiver 120 may receive an I-frame based MPEG data stream instead of the progressive I-slice refreshed MPEG data stream. In such an embodiment, the processor 150 may concatenate slices of multiple I-frames of the I-frame based MPEG data stream to form the constructed I-frame upon receipt of the trick play mode command. Applying the constructed I-frame algorithm to an I-frame based data stream provides for improved visual appearance during trick play modes and does not result in a drastic reduction of data throughput.

Those skilled in the art will appreciate that the configuration of the components shown in FIG. 2 is for example purposes only, and the various components which make up the display device 100 can be arranged in a variety of ways. For example, although FIG. 2 shows the interface 135, I-frame processing 155, and navigational data subsystem 160 as being implemented in a single processor 150, it should be appreciated that these components may be implemented as separate processors or in varying combinations of hardware and software. Similarly, even though the decoder 175 and syntax parser 125 are shown as being separate from processor 150, these components may be implemented as part of processor 150.

Figure 3:
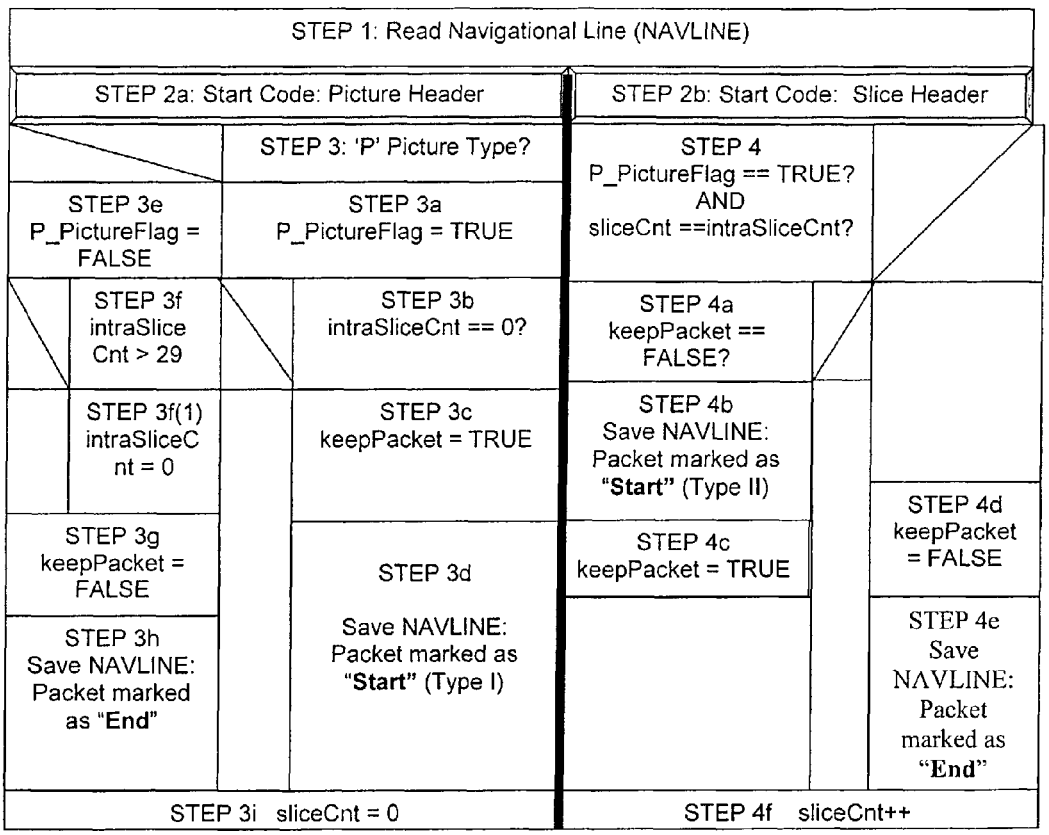
FIG. 3 shows a flow chart illustrating a procedure for assembling a constructed I-frame in accordance with the present invention.

FIG. 3 shows a flowchart illustrating a specific embodiment of the invention. The flowchart is based on the assumption that a table of start codes has been previously generated from the progressive I-slice refreshed data stream during the recording process (e.g., when the received data stream is parsed as discussed above). The table of start codes (referred to herein as a NAV table) corresponds to the indexing data described above. Each line of the NAV table will include the start code, the packet offset from start of the recording, and the byte offset into payload of the packet containing the start code (collectively referred to herein as NAV data). The NAV data is used to extract the transport packets that will form a constructed I-frame. Construction of the I-frame begins by concatenating "chains" of transport packets containing the Intra-coded slices together until an entire frame is built.

The flowchart of FIG. 3 assumes that video content is based on progressive I-slice compression. In addition, the flowchart assumes that the refresh rate is one second (10 'P' pictures and 20 'B' pictures=30 frames/sec) and that there are 30 slices per 'P' picture. Basically there are two types of packet "chains" that will form a constructed I-frame. Type I is a "chain" of packets that contains the 'P' picture header followed by three slices of intra-coded data. Type II is a "chain" of packets that contain only the three slices of intra-coded data. A constructed I-frame is a "chain" of one Type I and nine Type II "chains". Based on the logic in the flow chart a Type I or Type II "chain" is identified by a Start and an End packet.

Referring to FIG. 3, the chains of packets may be located and assembled as follows:

Step 1: Read a line of the Navigational Data (NAVLINE) that was formulated during the recording process.

Step 2: Execute the left column (Step 2a). If the start code in the NAVLINE is a picture start code (Go to Step 3). Execute the right column (Step 2b) if the start code in the NAVLINE is a slice start code (go to Step 4).

Step 3: Test if the picture is of type 'P'? Go to Step 3a if TRUE; go to Step 3e if False.

Step 3a: Set P_PictureFlag to TRUE.

Step 3b: Is the intraSliceCnt zero? This means the first slice of the constructed I frame has not yet been found and the current P-picture contains the first I-slice. Go to Step 3c if TRUE; go to Step 3i if False.

Step 3c: Set keepPacket flag to TRUE, which means that a chain has started.

Step 3d: Define Start here the packet containing the 'P' picture header is kept. Go to Step 3i.

Step 3e: Set P_Picture to FALSE.

Step 3f: Test if intraSliceCnt is 30, if TRUE reset counter to zero (Step 3f(1)).

Step 3g: Set keepPacket flag to False.

Step 3h: Save the location of this packet (save NAVLINE) as the End of the "chain".

Step 3i: Reset slice counter (sliceCnt) to zero. Go to Step 1.

Step 4: Test if current slice is in a 'P' picture and that it's intra-coded? Go to Step 4a if TRUE; go to Step 4d if False.

Step 4a: Test if the keepPacket Flag is set? Go to Step 4b if TRUE; go to Step 4f if FALSE.

Step 4b: Save the location of this packet (save NAVLINE) as the Start of the "chain". This "chain" of packets is a Type II because it doesn't include a picture header.

Step 4c: Set keepPacket flag to TRUE. Go to Step 4f.

Step 4d: Set keepPacket flag to FALSE.

Step 4e: Save the location of this packet (save NAVLINE) as the End of the "chain".

Step 4f: Increment slice counter (sliceCnt).

The steps are repeated after the slice count is incremented until a Start and End are identified. After a Start and End have been identified the chain may be appended to the previously found chain. When a complete constructed I-frame is formed the "chains" are sent to the video decoder for processing and display. The process is repeated for the duration of the fast forward or rewind command.

As shown in FIG. 4, a transport packet 200 typically includes a header 202, a PES header 204, an adaptation layer 206, and a payload portion 208. A stream of transport packets 210 makes up the progressive I-slice refreshed data stream. During the splicing of the transport packets, two operations maintain the integrity of the MPEG transport syntax:

(1) Overwriting the payload sections that are not part of the intra-coded slice. Part of the start and ending packet of the "chain" must be zeroed out. This removes the spurious data such as start codes that are not associated with the intra-coded slice. For example, in FIG. 4, the payload packets 212, 214, 216, and 218 of the stream of transport packets 210 are shown with the start of an I-slice 220 and an end of the I-slice 230. The non-slice portion 240 of the payload section 212 before the start of the I-slice 220 is zeroed out to provide a modified payload section 212'. Similarly, the non-slice portion 242 of the payload section 218 is zeroed out to provide a modified payload section 218'; and (2) Removal of collisions of the continuity count of two appended packets by sandwiching in a 'dummy' packet. Two packets with duplicate continuity counts cannot be appended together since the decoder will drop one of them. If a collision does occurs, an empty packet may be appended first to increment the continuity count. The result is a discontinuity in the count but this does not cause the appended packet of the next "chain" of packets to be dropped.

It should now be appreciated that the present invention provides advantageous methods and apparatus for processing progressive I-slice refreshed MPEG data streams or the like enable trick play mode playback, without the need to transcode the entire date stream into an I-frame based data stream. The invention can be implemented for use with a personal versatile recorder and a cable television set top box. The invention lowers the cost and improves the quality of providing PVR service in any video distribution system that uses the progressive I-slice refreshed MPEG encoding mode, as well as other types of progressively refreshed data streams.

Although the invention has been described in connection with various illustrated embodiments, numerous modifications and adaptations may be made thereto without departing from the spirit and scope of the invention as set forth in the claims.

What is claimed is:

1. A method for processing progressive I-slice refreshed MPEG data streams to enable trick play mode features on a display device having personal versatile recorder capabilities, comprising the steps of:

receiving at the display device a progressive I-slice refreshed MPEG data stream having I-slices distributed over multiple P-frames;

parsing the data stream to locate the I-slices which make up an I-frame;

storing said located I-slices in a storage device;
receiving a command for a trick play mode feature;
recovering the located I-slices from said storage device in response to said command;
assembling the recovered I-slices into one or more constructed I-frames; and
decoding the constructed I-frames to enable said trick play mode feature,
wherein only constructed I-frames are decoded for use during said trick play mode feature, said constructed I-frames being complete without gaps between I-slices, and only complete constructed I-frames are provided to said display device, and said constructed I-frames being complete without gaps between I-slices are from one video stream.

2. A method in accordance with claim 1, wherein the display device comprises one of a personal versatile recorder (PVR), a digital video recorder, a set-top terminal, a digital television, a cellular telephone, a personal digital assistant, or a personal computer.

3. A method in accordance with claim 1, wherein:
the I-slices which make up the constructed I-frame are distributed over N P-frames.

4. A method in accordance with claim 3, wherein N P-frames are provided in said data stream each refresh cycle.

5. A method in accordance with claim 1, wherein the trick play mode features comprise at least one of rewind and fast forward.

6. A method in accordance with claim 1, wherein each macroblock which forms the constructed I-frame is an intra-coded macroblock.

7. A method in accordance with claim 1, further comprising the step of:
receiving at the display device an I-frame based MPEG data stream instead of said progressive I-slice refreshed MPEG data stream; and
concatenating slices of multiple I-frames of said I-frame based MPEG data stream to form the constructed I-frame upon receipt of said command.

8. A method in accordance with claim 1, further comprising:
storing indexing data comprising a location of each I-slice within the data stream on said storage device; and
accessing said indexing data to locate and recover said I-slices.

9. A method in accordance with claim 8, wherein said indexing data further comprises:
a location of each I-slice positioned at a top portion of a P-frame.

10. A method in accordance with claim 9, wherein:
said command comprises a fast forward command establishing a fast forward interval;
said indexing data is used to locate a nearest I-slice positioned at the top portion of a P-frame in said data stream;
said nearest I-slice and I-slices subsequent in time thereto are recovered and assembled to form a constructed I-frame; and
for the duration of the fast forward interval:
said indexing data is used to locate subsequent additional I-slices positioned at the top portions of P-frames in said data stream; and
each subsequent additional I-slice and I-slices subsequent in time thereto are recovered and assembled to provide additional constructed I-frames.

11. A method in accordance with claim 10, wherein said nearest I-slice comprises one of an I-slice located forward of a current data stream position or prior to a current data stream position.

12. A method in accordance with claim 9, wherein:
said command comprises a rewind command establishing a rewind interval;
said indexing data is used to locate a nearest I-slice positioned at the top portion of a P-frame in said data stream;
said nearest I-slice and I-slices subsequent in time thereto are recovered and assembled to form a constructed I-frame; and
for the duration of the rewind interval:
said indexing data is used to locate previous additional I-slices positioned at the top portions of P-frames in said data stream; and
each previous additional I-slice and I-slices subsequent in time thereto are recovered and assembled to provide additional constructed I-frames.

13. A method in accordance with claim 12, wherein said nearest I-slice comprises one of an I-slice located forward of a current data stream position or prior to a current data stream position.

14. A method in accordance with claim 8, wherein said accessing of said indexing data is adapted to occur independently from accessing of said data stream.

15. A method in accordance with claim 8, wherein said accessing of said indexing data is adapted to occur either sequentially or at random temporal locations.

16. A method in accordance with claim 1, wherein:
the assembly of the constructed I-frame begins with a first located I-slice;
said first located I-slice is positioned below a top portion of a P-frame; and
the constructed I-frame contains a blank portion above the position of the first located I-slice.

17. A method in accordance with claim 1, wherein:
said command establishes a trick play mode speed; and
said trick play mode speed corresponds to a refresh rate of the MPEG data stream.

18. A method in accordance with claim 1, wherein:
said command establishes a trick play mode speed;
said trick play mode speed corresponds to a multiple of a refresh rate of the MPEG data stream.

19. A method in accordance with claim 1, wherein:
said command comprises a fast forward command establishing a fast forward interval.

20. A display device with personal versatile recorder capabilities enabled to process progressive I-slice refreshed MPEG data streams to enable trick play mode features, comprising:
a receiver for receiving a progressive I-slice refreshed MPEG data stream having I-slices distributed over multiple P-frames;
a syntax parser for parsing the data stream to locate the I-slices which make up an I-frame;
a storage device for storing the located I-slices;
an interface for receiving a command for a trick play mode feature;
a processor associated with the syntax parser for recovering the located I-slices from the storage device and assembling the recovered I-slices into one or more constructed I-frames; and
a decoder for decoding the constructed I-frames to enable said trick play mode features,
wherein only constructed I-frames are decoded for use during said trick play mode feature, said constructed I-frames being complete without gaps between I-slices, and only complete constructed I-frames are displayed, and said constructed I-frames being complete without gaps between I-slices are from one video stream.

21. Display device in accordance with claim 20, comprising one of a personal versatile recorder (PVR), a digital video recorder, a set-top terminal, a digital television, a cellular telephone, a personal digital assistant, or a personal computer.

22. Display device in accordance with claim 20, wherein:
the I-slices which make up the constructed I-frame are distributed over N P-frames.

23. Display device in accordance with claim 22, wherein N P-frames are provided in said data stream each refresh cycle.

24. Display device in accordance with claim 20, wherein the trick play mode features comprise at least one of rewind and fast forward.

25. Display device in accordance with claim 20, wherein each macroblock which forms the constructed I-frame is an intra-coded macroblock.

26. Display device in accordance with claim 20, wherein:
said receiver receives an I-frame based MPEG data stream instead of said progressive I-slice refreshed MPEG data stream; and
the processor concatenates slices of multiple I-frames of said I-frame based MPEG data stream to form the constructed I-frame upon receipt of said command.

27. Display device in accordance with claim 20, wherein:
said syntax parser provides indexing data comprising a location of each I-slice within the data stream;
said indexing data is stored on said storage device; and
said processor accesses said indexing data to locate and recover said I-slices.

28. Display device in accordance with claim 27, wherein said indexing data further comprises:
a location of each I-slice positioned at a top portion of a P-frame.

29. Display device in accordance with claim 28, wherein:
said command comprises a fast forward command establishing a fast forward interval;
said indexing data is used to locate a nearest I-slice positioned at the top portion of a P-frame in said data stream;
said nearest I-slice and I-slices subsequent in time thereto are recovered and assembled to form a constructed I-frame; and
for the duration of the fast forward interval:
said indexing data is used to locate subsequent additional I-slices positioned at the top portions of P-frames in said data stream; and
each subsequent additional I-slice and I-slices subsequent in time thereto are recovered and assembled to provide additional constructed I-frames.

30. Display device in accordance with claim 29, wherein said nearest I-slice comprises one of an I-slice located forward of a current data stream position or prior to a current data stream position.

31. Display device in accordance with claim 28, wherein:
said command comprises a rewind command establishing a rewind interval;
said indexing data is used to locate a nearest I-slice positioned at the top portion of a P-frame in said data stream;
said nearest I-slice and I-slices subsequent in time thereto are recovered and assembled to form a constructed I-frame; and
for the duration of the rewind interval:
said indexing data is used to locate previous additional I-slices positioned at the top portions of P-frames in said data stream; and
each previous additional I-slice and I-slices subsequent in time thereto are recovered and assembled to provide additional constructed I-frames.

32. Display device in accordance with claim 31, wherein said nearest I-slice comprises one of an I-slice located forward of a current data stream position or prior to a current data stream position.

33. Display device in accordance with claim 27, wherein said processor is adapted to access said indexing data independently from accessing of said data stream.

34. Display device in accordance with claim 27, wherein said processor is adapted to accesses said indexing data either sequentially or at random temporal locations.

35. Display device in accordance with claim 20, wherein:
the assembly of the constructed I-frame begins with a first located I-slice; said first located I-slice is positioned below a top portion of a P-frame; and
the constructed I-frame contains a blank portion above the position of the first located I-slice.

36. Display device in accordance with claim 20, wherein:
said command establishes a trick play mode speed; and
said trick play mode speed corresponds to a refresh rate of the MPEG data stream.

37. Display device in accordance with claim 20, wherein:
said command establishes a trick play mode speed; and
said trick play mode speed corresponds to a multiple of a refresh rate of the MPEG data stream.

* * * * *